June 17, 1930.  A. L. DE LEEUW  1,765,059
AIR CUSHIONED MECHANISM
Filed June 29, 1928
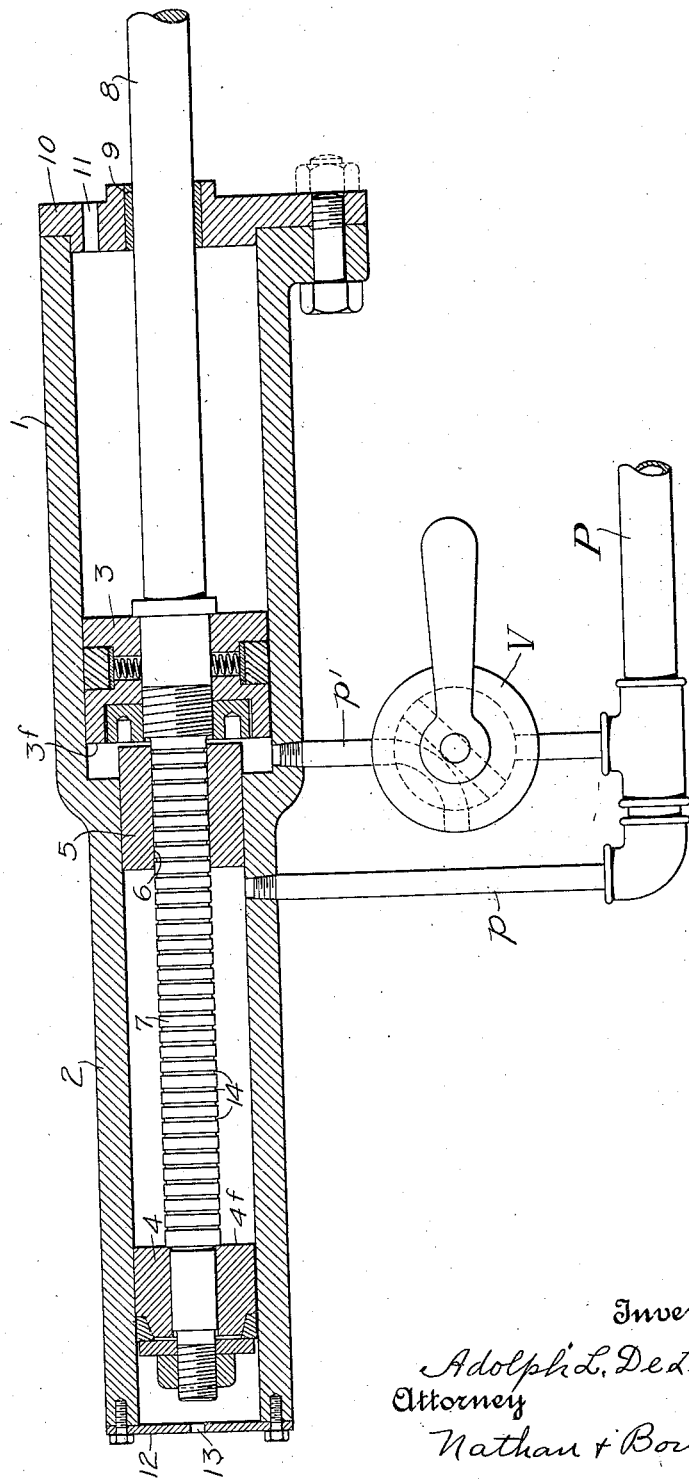
Inventor
Adolph L. De Leeuw
Attorney
Nathan & Bowman Patented June 17, 1930

1,765,059

UNITED STATES PATENT OFFICE

ADOLPH L. DE LEEUW, OF PLAINFIELD, NEW JERSEY, ASSIGNOR TO THE GOSS AND DE LEEUW MACHINE COMPANY, OF NEW BRITAIN, CONNECTICUT, A CORPORATION OF CONNECTICUT

AIR-CUSHIONED MECHANISM

Application filed June 29, 1928. Serial No. 289,312.

This invention proposes a novel adaptation of the principle of a compound piston in a way such that the objectionable abruptness of air-actuated mechanisms will be obviated by maintaining a permanent air-cushion having the dual function of accomplishing the return stroke during the exhaust of the air admitted for performing the advance stroke, as well as graduating the advance stroke during the admittance of the air from the external source of pressure.

From a structural standpoint, the invention seeks also to realize simplicity and to avoid mechanical difficulties (such as air tight stuffing boxes, complicated valves etc) by presenting an arrangement unaffected by slight air leaks and in which a simple three-way valve will serve to accomplish the advance and return strokes in an even and smooth manner by merely admitting air from the source to the main cylinder and by merely permitting it to escape therefrom.

Numerous attempts heretofore have been made to attain the results attained by this invention but such prior attempts have not been wholly successful. One of the conventional prior constructions comprises a cylinder, the opposite ends of which are connected with fluid pressure lines. Within the cylinder there is slidingly fitted a piston, having opposite ends of unequal areas, usually due to the existence of a piston rod at one end only of the piston. Thus when fluid under equal pressure is admitted to both ends of the cylinder, the piston is moved in one direction by the differential in force exerted thereon due to the difference in the piston areas. When the pressure in the more effective side is relieved the piston is moved in the other direction by the minor force. The piston rod projects through a stuffing box at one end of the cylinder and, to preclude the escape of air from the cylinder, it is essential that the stuffing box grip the piston rod tightly. This creates a substantial friction which greatly reduces the efficiency of the device and renders it expensive to operate.

This invention has overcome the undesirable features of prior constructions and has provided a fluid actuated mechanism of the compound piston type by means of which a work performing element, hereinafter called a work-rod, may be reciprocated in opposite directions without jar, without leakage losses, without the use of fluid tight stuffing boxes, and without the use of complicated valve mechanisms. This has been accomplished by arranging a pair of cylinders end-to-end, fitting therein pistons having unequal effective areas, connecting said pistons together by a piston rod and admitting fluid under pressure into said cylinders between said pistons. A work-rod projects from the pressure-free end of one of said pistons and is adapted to perform work by reason of the reciprocating of its actuating piston. The pistons, with the walls of their respective cylinders form air-tight seals which retain the fluid. The piston rod is wholly within the cylinders and therefore the need of stuffing boxes is precluded. It will readily be perceived that if fluid under pressure is admitted into the cylinders between the adjacent ends of the pistons a greater force will be exerted on the piston having the greater area and therefore the pistons, the piston rod and the work-rod will be moved in one direction by the differential in force. This invention also provided means for relieving the pressure on the major piston whereby the pressure maintained on the minor piston may serve to retract the pistons and work-rod. This is effected by providing a partition between the two cylinders through which the piston rod passes and providing means for exhausting the fluid from the major cylinder while the pressure is maintained in the minor cylinder.

Although this invention is adaptable to both pneumatic and hydraulic systems it will hereinafter be described in connection with the former inasmuch as when used in connection with air pressure which is substantially instantaneous in its action, the pressure maintained in the minor cylinder serves as a cushion for the device to prevent jars and jerky action common to pneumatically actuated devices.

Other objects and advantages will be in part indicated in the following description and in part rendered apparent therefrom in connection with the annexed drawing.

To enable others skilled in the art so fully to apprehend the underlying features hereof that they may embody the same in the various ways contemplated by this invention, a drawing depicting a preferred typical construction has been annexed as a part of this disclosure.

The drawing is a central longitudinal section of a device embodying the present invention.

The invention is illustrated as embodied in a device comprising a major cylinder 1 and a minor cylinder 2 within which are slidably fitted pistons 3 and 4, respectively. The cylinders are arranged end-to-end and preferably, but not necessarily, are formed integral. The bores of the two cylinders are separated by a partition 5 formed with a bore 6 affording a bearing for a piston rod 7, suitably connecting the two pistons. The area of the face $3^f$ of the major piston 3 is substantially greater than the area of the face $4^f$ of the minor piston 4. Therefore if equal fluid pressures be admitted into the cylinders between the faces $3^f$ and $4^f$ of the pistons and the partition 5 a greater force will be exerted on the piston 3 than on the piston 4 with the result that the pistons will be moved to the right under the differential force, the fluid in the cylinder 2 serving as a cushion to prevent harsh and jerky movement of the pistons.

A fluid pressure line P has one branch $p$ connected with the minor cylinder and another branch $p'$ connected with the major cylinder 1. Flow of fluid through the branch $p'$ into the cylinder 1 and exhaust of the fluid therefrom is controlled by a three-way valve V of conventional form. A work-performing rod 8 is connected with the pressure free end of the piston 3 and is guided in its reciprocation by a bearing 9 provided by an end-plate 10 which closes the outer end of the major cylinder 1. This work-rod may be formed integral with the piston rod as shown, or independent thereof. A vent 11, formed in the end-plate serves as an intake and exhaust port for air to maintain the outer end of the cylinder under substantially atmospheric pressure. The outer end of the cylinder 2 is closed by a plate 12 formed with a vent 13 for a like purpose. The piston rod 7 is formed with a plurality of annular grooves 14 which serve to retain lubricant and thereby retard leakage of air from the cylinder 2 into the cylinder 1 when the pressure in the latter is reduced below the pressure in the former.

Assuming that the valve V is so positioned that that portion of the cylinder 1 between the face $3^f$ of the piston and the partition 5 is connected with an exhaust and that fluid pressure is maintained in the cylinder 2 by its connection $p$ with the pressure line P, the operation of the device is as follows: The operator manually shifts the valve to close the exhaust and to connect the cylinder 1 with the pressure line through the branch line $p'$. As hereinbefore described, this will cause the piston 3 to move to the right carrying with it the piston rod and the piston 4, and advancing the work-rod, the fluid in the cylinder 2 being forced back into the pressure line through the branch $p$. It will readily be perceived that with this construction any slight leakage of fluid through the bearing 6 is of no consequence inasmuch as it is maintained in the system. After the parts have been moved to the right the operator may, by manipulating the valve V disconnect the cylinder 1 from the pressure line P and open the cylinder to an exhaust, thereby reducing the pressure therein to zero. The pressure in the cylinder 2 will then move the piston 4, the piston rod, and the piston 3 to the left, retracting the work-rod.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be comprehended within the meaning and range of equivalency of the following claims:—

Having thus revealed this invention, I claim as new and desire to secure the following combinations and elements, or equivalents thereof, by Letters Patent of United States:—

1. An air actuated device combining a plurality of aligned cylinders; a piston slidably mounted in each of said cylinders said pistons presenting unequal effective areas; a partition separating said cylinders; a piston rod connected with both of said pistons and passing through said partition; a work rod connected with one of said pistons; an air pressure line permanently connected with the cylinder containing the piston of lesser effective area between the piston therein and said partition; means to admit air pressure from said line into the cylinder containing the piston having the greater effective area between the piston and said partition to move said work rod in one direction under the differential forces exerted on said pistons; and means to exhaust the air from the last named cylinder to cause said work rod to be moved in the opposite direction by pressure in the other cylinder.

2. A fluid pressure actuated device combining a plurality of aligned cylinders; a piston slidably mounted in each of said cylinders said pistons having unequal effective areas; a piston rod connecting said pistons; a partition separating said cylinders and affording a bearing for said piston-rod; means to maintain a predetermined fluid pressure in one of said cylinders between said partition and the piston having the lesser effective area; and means to admit fluid under like pressure into the other cylinder between the piston therein and said partition to move said pistons and piston rod in one direction under the differential force exerted on said pistons.

3. A fluid pressure actuated device combining a pair of cylinders arranged end-to-end; pistons having unequal effective areas fitted within said cylinders; a piston rod connecting said pistons; a work-rod connected to one of said pistons; a partition separating said cylinders and affording a bearing for said rod; means to admit fluid pressure into said cylinders at opposite sides of said partition and at the adjacent ends of said pistons to cause said pistons and piston rod to be moved in one direction by the differential in force simultaneously exerted on said pistons; and means to discontinue the flow of fluid to the cylinder containing the piston having the greater effective area and to connect said cylinder with an exhaust thereby to cause said pistons and piston-rod to be moved in the opposite direction by the fluid pressure in the other cylinder.

4. An air cushioned mechanism combining a pair of aligned cylinders; pistons having unequal effective areas slidingly fitted within said cylinders; a piston-rod connecting said pistons; a partition separating said cylinders and affording a passage-way for said piston-rod; means for maintaining a predetermined air cushion between the smaller of said pistons and said partition; means to admit air pressure into the cylinder containing the larger piston between the last named piston and said partition to move said pistons and piston-rod in opposition to said air cushion; means for exhausting the air from the last named cylinder; and a work rod connected to the pressure free end of one of said pistons.

5. A fluid pressure actuated device combining a pair of cylinders arranged end-to-end; pistons fitted within said cylinders; a piston-rod connecting said pistons; a partition separating said cylinders and affording a passage-way for said rod; means to admit fluid pressure into said cylinders at opposite sides of said partition and at the adjacent ends of said pistons to exert unequal forces on said pistons thereby to cause said pistons and piston-rod to be moved in one direction by the differential in force simultaneously exerted on said pistons; and means to vary the forces applied to said pistons to cause said pistons and piston-rod to be moved in the opposite direction under the influence of the fluid pressure in the other cylinder.

6. A device of the character described combining a plurality of aligned cylinders; pistons having unequal effective areas fitted within said cylinders; a piston-rod connecting said pistons; a partition separating said cylinders and affording a passage-way for said rod; means to admit fluid under pressure into said cylinders at opposite sides of said partition and between the adjacent ends of said pistons and said partition, whereby said pistons and piston-rod are moved in one direction by the differential in force applied thereto; means to connect the cylinder containing the piston having the greater area with an exhaust whereby the pressure in the other cylinder acts to move said pistons and piston-rod in the other direction; walls substantially closing the outer ends of said cylinders and a vent in each of said walls to maintain the outer ends of said cylinders under substantially atmospheric pressure.

7. A fluid pressure actuated mechanism combining two integrally formed cylinders having bores of unequal cross sectional areas said cylinders being arranged end-to-end; a piston fitted within each of said bores; a partition separating said bores and affording a passage-way for said piston-rod; means to admit fluid pressure into said cylinders between the adjacent ends of said pistons to effect reciprocation of said pistons under the differential in force applied thereto; and a work-performing element connected to the pressure-free end of one of said pistons.

In witness whereof, I hereunto subscribe my name.

ADOLPH L. DE LEEUW.